(12) United States Patent
Dellerson et al.

(10) Patent No.: US 9,901,039 B1
(45) Date of Patent: Feb. 27, 2018

(54) GROW LIGHT FAN

(71) Applicants: Chad Eric Dellerson, West Palm Beach, FL (US); Gary J. Dellerson, West Palm Beach, FL (US)

(72) Inventors: Chad Eric Dellerson, West Palm Beach, FL (US); Gary J. Dellerson, West Palm Beach, FL (US)

( * ) Notice: Subject to any disclaimer, the term of this patent is extended or adjusted under 35 U.S.C. 154(b) by 0 days.

(21) Appl. No.: 15/195,215

(22) Filed: Jun. 28, 2016

Related U.S. Application Data

(60) Provisional application No. 62/233,006, filed on Sep. 25, 2015.

(51) Int. Cl.
| | |
|---|---|
| *F04D 25/08* | (2006.01) |
| *A01G 9/26* | (2006.01) |
| *A01G 7/04* | (2006.01) |
| *A01G 9/24* | (2006.01) |
| *A01G 9/20* | (2006.01) |
| *F04D 29/00* | (2006.01) |
| *F04D 29/32* | (2006.01) |
| *F04D 27/00* | (2006.01) |
| *H05B 37/02* | (2006.01) |

(Continued)

(52) U.S. Cl.
CPC .............. *A01G 9/26* (2013.01); *A01G 7/045* (2013.01); *A01G 9/20* (2013.01); *A01G 9/246* (2013.01); *F04D 25/088* (2013.01); *F04D 27/004* (2013.01); *F04D 27/007* (2013.01); *F04D 29/005* (2013.01); *F04D 29/325* (2013.01); *F04D 29/384* (2013.01); *F21S 8/04* (2013.01); *F21V 23/003* (2013.01); *F21V 23/0435* (2013.01); *F21V 33/0096* (2013.01); *H05B 33/0845* (2013.01); *H05B 33/0857* (2013.01); *H05B 37/0272* (2013.01); *F05D 2270/03* (2013.01); *F21Y 2115/10* (2016.08)

(58) Field of Classification Search
CPC .... F04D 25/088; F04D 27/004; F04D 29/005; F04D 29/384; F05D 2270/03; A01G 9/26; A01G 7/045; A01G 9/20; A01G 9/246; F21S 8/04; F21V 23/003; F21V 23/0435; F21V 33/0095; H05B 33/0845; H05B 33/0857

See application file for complete search history.

(56) References Cited

U.S. PATENT DOCUMENTS 3,051,072 A * 8/1962 Bohanon ................. F04D 29/28
416/197 R
3,063,195 A * 11/1962 Ravich .................... A01G 7/045
47/17

(Continued)

FOREIGN PATENT DOCUMENTS

WO     WO 2013024682 A1 *  2/2013  ............. A01G 7/045

*Primary Examiner* — Ninh H Nguyen
(74) *Attorney, Agent, or Firm* — H. John Rizvi; Gold & Rizvi, P.A.

(57) ABSTRACT

A grow light fan is provided including a motorized housing, a fan assembly attached to the motorized housing and including a plurality of fan blades and a plurality of grow lights mounted on an underside of each fan blade. A controller is provided in the motorized housing and receives signals remotely, from a transmitter held by a user, to control the intensity of the grow lights and the speed and direction of the motor. A shroud and mounting bracket are also provided to secure and protect the grow light fan within a grow room.

18 Claims, 6 Drawing Sheets

(51) Int. Cl.
*F21V 33/00* (2006.01)
*H05B 33/08* (2006.01)
*F21V 23/00* (2015.01)
*F21S 8/04* (2006.01)
*F21V 23/04* (2006.01)
*F04D 29/38* (2006.01)
*F21Y 115/10* (2016.01)

(56) References Cited

U.S. PATENT DOCUMENTS

| | | | |
|---|---|---|---|
| 4,196,544 A * | 4/1980 | Davis | A01G 7/045 |
| | | | 165/47 |
| 4,734,830 A * | 3/1988 | Cristian | A01G 7/045 |
| | | | 362/1 |
| 5,082,422 A | 1/1992 | Wang | |
| 5,437,540 A * | 8/1995 | Blocker | F04D 25/088 |
| | | | 310/232 |
| 6,037,876 A | 3/2000 | Crouch | |
| 6,688,759 B1 * | 2/2004 | Hadjimichael | A01G 7/045 |
| | | | 362/405 |
| 7,472,513 B2 * | 1/2009 | Bula | A01G 9/16 |
| | | | 47/58.1 LS |
| 8,100,649 B2 | 1/2012 | Okimura | |
| 8,322,011 B2 | 12/2012 | Hargreaves | |
| 8,506,121 B2 | 8/2013 | Van Laanen et al. | |
| 2003/0231956 A1 | 12/2003 | Lin | |
| 2006/0120064 A1 | 6/2006 | McElhannon | |
| 2009/0297345 A1 | 12/2009 | Crace | |
| 2010/0289411 A1 * | 11/2010 | Smits | A01G 7/045 |
| | | | 315/113 |
| 2011/0125296 A1 * | 5/2011 | Bucove | A01G 7/045 |
| | | | 700/90 |

* cited by examiner

GROW LIGHT FAN

CROSS-REFERENCE TO RELATED APPLICATION

This application claims the benefit of U.S. Provisional Patent Application Ser. No. 62/233,006, filed Sep. 25, 2015, which is incorporated herein in its entirety.

FIELD OF THE INVENTION

The present invention relates generally to grow lights for indoor plants and, more particularly, to a remotely controlled grow light fan which incorporates a series of grow lights into a ventilation fan for evenly distributing light over plants without overheating of the grow lights.

BACKGROUND OF THE INVENTION

In many horticultural situations, plants are grown indoors in warehouses or individual grow rooms using artificial light. This is true for decorative or vegetable type plants to grow the plants outside of normal growing seasons. Additionally, many plants that are in constant demand throughout the year, such as, for example, spices or marijuana are grown indoors. Typically, individual grow lamps or lights are mounted on strips or in the ceiling positioned above plants located on tables or growing terraces or other platforms.

The individual grow lamps project growing spectrums of light directly onto the plants. In some instances, the spacing of the grow lights inconsistently direct light onto plants within a grow room creating localized spots of concentrated light intensity, "hot spots" of light, in certain areas while depriving other areas. For example, common grow lamps may cause some plants to receive too much light intensity, and other plants to receive too little light intensity.

Further, the individual grow lamps generate a significant amount of localized heat around themselves leading to overheating and lamp burn out. Ventilated covers and expensive aluminum heat sinks have been used to attempt to overcome these problems with some success. Further, dedicated separate fans or air conditioning have been used to maintain the grow lights at proper operating temperature by aiming the fans toward the grow lights. However, they all add to the cost and the complexity of the equipment to be maintained within the grow room. Additionally, where external cooling devices are used to cool the grow lights, offsetting heaters may need to be provided to maintain the grow room at a warm enough temperature for optimal plant growth and at further expense and complexity.

Accordingly, there is an established need for a grow light that can project a uniform swath of light across plants within a grow room. There is also a further established need for a grow light system that is self cooling to avoid overheating of the grow lights.

SUMMARY OF THE INVENTION

The present invention is directed to a grow light fan and a grow light fan assembly for providing remotely adjustable user control of a fan and grow lights to plants within a grow room.

Introducing a first embodiment of a grow light fan for uniformly illuminating plants, the grow light fan consists of, a motorized housing assembly including a bell housing, a motor support bracket suspended from the bell housing and a motor mounted within the motor support bracket, a fan blade assembly connected to the motor and including a central hub rotatably mounted relative to the motor support bracket, a plurality of fan blades extending from the central hub and multiple grow lights mounted on an underside of each fan blade of said plurality of fan blades, and a controller mounted within the bell housing, wherein the controller controls the grow lights.

In a second aspect, the controller controls the speed and direction of the motor.

In another aspect, the controller is mounted on the motor support bracket.

In another aspect, the controller includes a circuit board and a receiver.

In another aspect, the motor support bracket includes a pair of electrical contacts in electrical communication with the controller.

In another aspect, the central hub includes a pair of electrical pickups in electrical communication with the grow lights.

Disclosed is a grow light fan for uniformly illuminating a target plant, the grow light fan comprising, a motor, the motor supported by a support structure, the motor configured to rotate one or more fan blades about a rotation axis, and one or more grow lights fixed to the one or more fan blades, the one or more grow lights configured to stimulate growth of the target plant by illuminating the target plant.

In another aspect, the fan blades are configured to project air toward the target plant during rotation of the fan blades.

In another aspect, the support structure includes an electrical connector to electrically connect the one or more grow lights to a power source, the electrical connector providing power to the one or more grow lights continuously during rotation of the one or more fan blades.

In another aspect, the grow light fan further comprises a controller to control a rotation speed of the one or more fan blades.

In another aspect, the grow light fan further comprises a controller to control a rotation direction of the one or more fan blades.

In another aspect, the grow light fan further comprises a controller to control a light intensity of the one or more grow lights.

In another aspect, the grow light fan further comprises a controller to selectively switch the one or more grow lights on and off.

In another aspect, the grow light fan further comprises a controller to control a wavelength emitted by the one or more grow lights.

In another aspect, the grow light fan further comprises a controller to control illumination of the one or more grow lights, the controller operatively connected to a wireless remote device.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
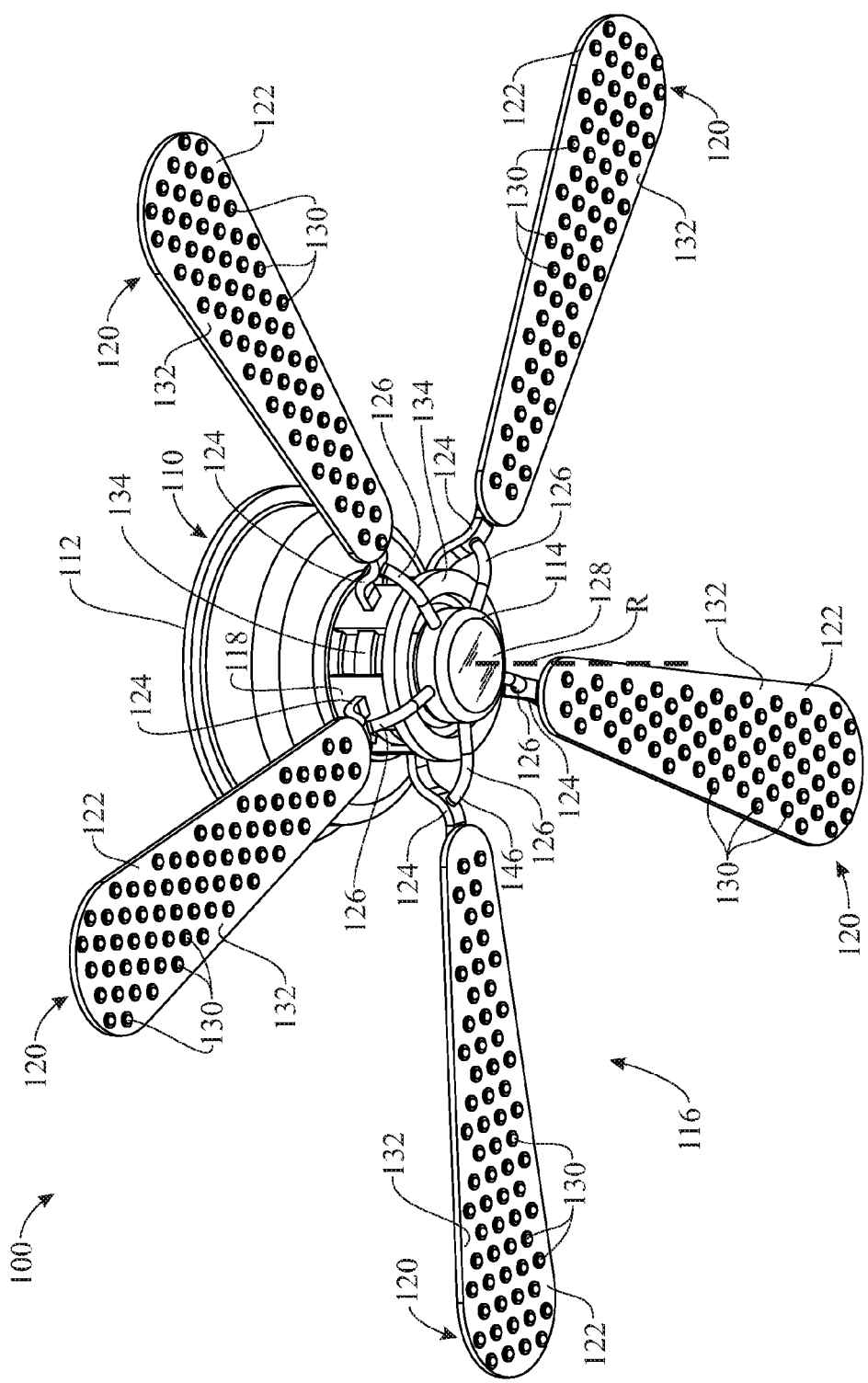
FIG. 1 presents a bottom perspective view of one embodiment of a grow light fan, in accordance with aspects of the present disclosure.

Referring to FIGS. 1-5, and initially with regard to FIG. 1, a grow light fan 100 is illustrated in accordance with an exemplary first embodiment of the present invention. The grow light fan 100 generally includes a motorized housing assembly 110, including a bell housing 112 and a motor 114 mounted within the bell housing 110, and a fan blade assembly 116 including a central hub 118 having a plurality of fan blade units 120 extending outwardly or radially from the central hub 118. Each fan blade unit 120 includes a paddle shaped fan blade 122 connected to the central hub 118 by a support bar 124. For example, the fan blade assembly 116 may be the entire rotating structure. The fan blade unit 120 may include one fan blade, and one or more structures (e.g. central hub 118 and/or the support bars and/or the connecting bars) to rotatably attach the fan blade to the housing or the motor support bracket 134. The fan blade 122 may be an individual fan blade (e.g. a majorly planar structure). In some embodiments, the fan blades may be rods or the fan blades may have any appropriate width, thickness, or length. The fan blades may have a same width all along a length of the fan blades. It is to be understood that the definition of the term "fan blade" as used herein is not limited to being the definition of a commonly known fan blade, and may instead be a rod or a stick or any long object that can be rotatably attached radially to the motorized housing assembly or fixedly attached to a rotating structure of the motorized housing assembly, or any long planar object that may force or circulate air when moved in a generally normal (perpendicular) direction with respect to a planar surface of the planar object. The grow light fan 100 may include any number of fan blades, such as between 1-12 fan blades. The fan blades may be directly attached to the central hub 118 or indirectly attached to the central hub 118 via the support bars 124. The fan blades may be directly or indirectly attached to the rotating lower unit 128 of the motor 114. The fan blades may be fixedly attached to any rotating element of the motor. Connecting bars 126 extend from a rotating lower unit 128 of the motor 114 and are affixed to the support bars 124 such that rotation of the rotating lower unit 128 rotates, or causes to rotate, the entire fan blade assembly 116 about or relative to the motorized housing assembly 110. The fan blades may be attached to any structure that is rotated by the motorized housing assembly or motor. For example, the motor may cause the lower unit 128 or the central hub 118 to rotate, subsequently causing the one or more fan blades that are attached to the lower unit 128 or the central hub 118 to rotate, or more generally, causing the fan blade assembly 116 to rotate. For example, the blades 122 may rotate about an axis (shown as rotation axis R in FIG. 1) of the rotating or rotatable lower unit 128, and/or the rotatable central hub 118, the axis being vertical and perpendicular with respect to a ceiling (i.e. support structure) or flat object on which the housing 112 is attached, or in some embodiments, the axis being perpendicular with respect to a rotational plane (or bottom structural plane) of the lower unit 128 or the central hub 118. For example, the lower unit 128 or the central hub 118 may be cylindrical, or have a circular or circular planar rotating portion that rotates in a plane in a circular manner, and a longitudinal direction of the rotation axis R of the blades may be generally perpendicular to the plane of rotation of the central hub 118 or the lower unit 128. If imaginarily extended, the rotation axis R may vertically pass through a center of the motorized housing assembly, the lower unit 128, or the central hub 118 symmetrically and/or centrally. For example, the various rotating components that rotate about the rotation axis R may be radially symmetrical to avoid wobbling of the grow light fan 100 during operation of the grow light fan 100, and/or the rotation axis R may pass through a center of mass of the motorized housing assembly 110 upward as shown in FIG. 1. As another example, the rotation axis of the fan blades 122 may be perpendicular to a plane in which the fan blades 120 rotate in, or pass through during rotation. It is to be understood that the fan blade units 120 and the fan blades 122 may be invariably referred to herein. The rotation axis may be located at or may extend through a central structure (e.g. central hub 118, the lower unit 128, and/or housing 112) where the fan blades are attached, directly or indirectly. The fan blade units 120 may be or may extend flat and parallel with respect to the plane in which the fan blades rotate. In other words, the fan blade units 120 may be flat and may extend perpendicular with respect to the rotational axis R, where a normal direction of a face of the fan blade units 120 are parallel with respect to the rotational axis R. Alternatively, the fan blade units may be or may extend non-perpendicular with respect to the rotational axis R. The fan blades may be planar, and each fan blade may have a major planar surface or a face, where the planar surface may have a normal (perpendicular) direction that is either parallel with the rotation axis R or slightly or significantly tilted away and non-parallel with respect to the rotation axis R. The fan blades may be in a same plane of rotation of the rotating central hub 118 and/or rotating lower unit 128. The fan blades may be angled relative to a plane of rotation of the fan blades.

Figure 2:
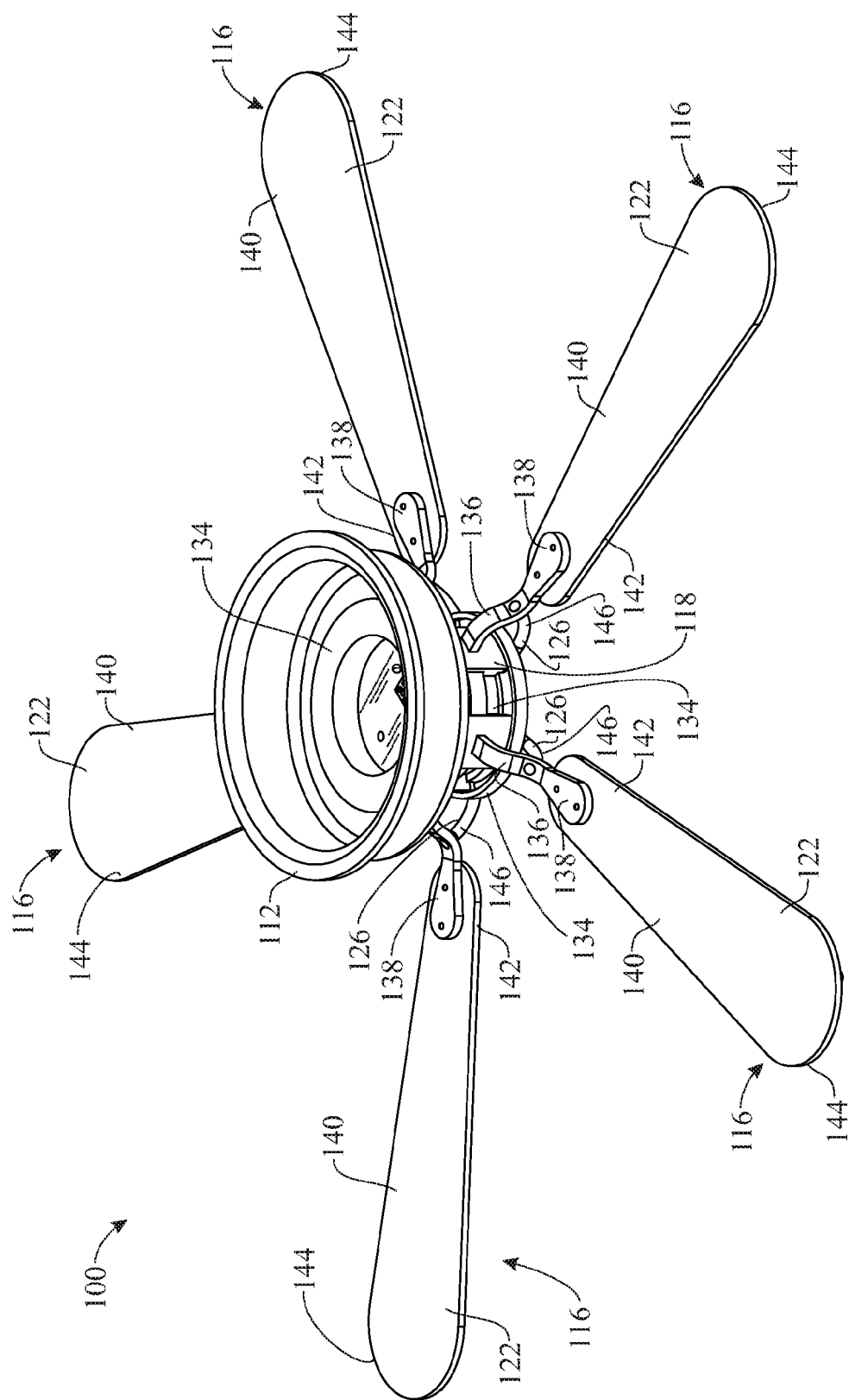
FIG. 2 presents a top perspective view of the grow light fan, in accordance with aspects of the present disclosure.
Figure 6:
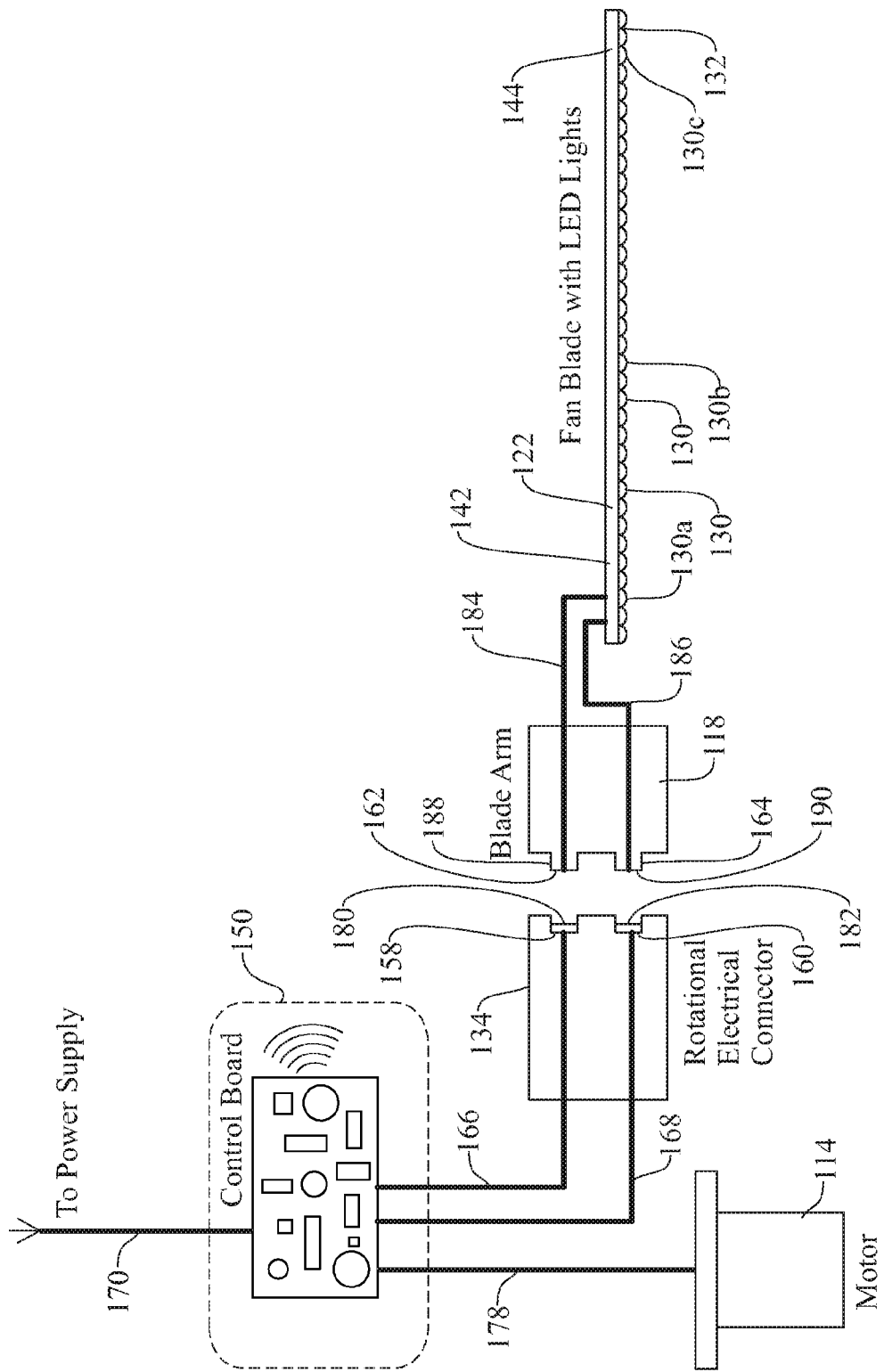
FIG. 6 presents a schematic diagram of the electrical components of the grow light fan, in accordance with aspects of the present disclosure.

It is to be understood that the central hub 118 may be one rotatable structure on which all fan blades are indirectly or directly attached, or may be a plurality of rotatable structures to which one or more fan blades are each attached respectively to each rotatable structure of the plurality of rotatable structures. For example, each rotatable structure of the plurality of rotatable structures may include rings 162 and 164, or an equivalent structure providing the same functionality. For example, each rotatable structure of the plurality of rotatable structures may each include pickups 188 and 190 as shown in FIG. 6. As an example, FIG. 2 shows the central hub 118 including a plurality of rotatable structures that slide along the channels of the support cylinder 134.

It is to be understood that the bell housing may be fixedly attached to a ceiling or other fixed structure (i.e. support structure, a rack, or a frame), at a top area of the bell housing. The bell housing itself may be considered a support structure for the rest of the grow light fan elements. Further, it is to be understood that various structures remain fixed relative to the bell housing or the ceiling or the fixed structure, and various other structures rotate or move relative to the bell housing or the ceiling or the fixed structure. Any of the structures that remain fixed relative to the rotating structures may be referred to as a support structure, and any rotating structure may be referred to as a rotating structure. For example, the motor support bracket 134 remains fixed relative to the bell housing 112. The fan blades 122, the connecting bar 126, the support bar 124, the central hub 118, and the rotating lower unit 128 may rotate about rotational axis R. The motor 114 itself may rotate, or may be configured to cause the rotating parts to rotate. The motor support bracket 134 may be considered a support structure.

Rotating the fan blades causes a stream of air to move across the fan blade units 120, and/or causes air to be projected generally downward and generally or exactly parallelly with respect to a longitudinal direction of rotation axis R of the rotating blades 120. For example, air may be projected downward away from the housing 112, or alternatively upward toward the housing 112 according to the configuration, tilt and angle of the fan blades with respect to the rotation axis R. The fan blades 120 rotating causes air to circulate in a room, a vicinity, or general area where the grow light fan 100 is disposed. For example, the fan blades may be configured to push air down or pull air up due to their rotation. It is to be understood that the fan blades may rotate in a clockwise or counterclockwise direction. The fan blades are configured to move air such that localized heat, or hot spots, are eliminated or dissipate as further described below.

In order to uniformly illuminate plants and maximize surface area of the plants that is exposed to illumination, the fan blade units 120 additionally include a plurality of grow lights 130 provided, attached, or fixed to or within and/or on an underside 132 of each of the fan blades 122 of the fan blade units 120. The grow lights 130 are preferably, individual Light Emitting Diodes or LED's extending or projecting laterally, downwardly, or in a downward normal direction with respect to a major planar surface of each fan blade, or generally projecting from the undersides 132 of the fan blades 122. For example, the LED's may be configured, placed, or aimed to illuminate target plants disposed downward from a rotating plane of the rotating fan blades, or generally or directly below the grow light fan 100, or in a downward longitudinal direction of the rotation axis R described above. The grow lights 130 may be any appropriate light configured to stimulate plant growth, and may be configured to emit an electromagnetic spectrum appropriate for photosynthesis, and may be housed flush within the fan blades or otherwise may be slightly projecting perpendicularly from major planar surfaces of the fan blades. The grow lights may be each surrounded by a space, hole or dip such that more surface area of each light is exposed to moving or cool air. The grow lights may extend through a thickness of the fan blades, the thickness having a vertical and normal (perpendicular) dimension with respect to a major planar surface of the fan blades. The grow lights 130 may extend through the thickness of the fan blades either completely or partially. In some embodiments, the grow lights 130 are simply attached to a continuous major planar surface of the fan blades. By extending or projecting laterally from the undersides 132 of the fan blades 122, the grow lights 130 (LED's) are cooled by air passing over them as the fan blade assembly 116 rotates about the motorized housing assembly 110 (e.g. about rotation axis R). A motor support bracket or cylinder 134 is attached to the bell housing 112 and supports the motor 114 for providing rotation of the rotating elements relative to the bell housing 112. The motor support cylinder 134 additionally provides an electrical conduit between the motorized housing assembly 110 and the grow lights 130 provided on the fan blades 122 as described in more detail herein. For example, the motor support cylinder 134 maintains electrical contact between the grow lights 130 and a power source continuously during rotation of the fan blades 122. Rotating the fan blades 122 causes air to circulate in a room or area in which the grow light fan 100 is disposed such that localized hot spots of heat may be eliminated. For example, heat localized near the grow lights 130, caused by the grow lights 130, may be dissipated due to the air circulation or air passing over the fan blades 122 caused by the rotating fan blades 122. Further, heat localized near plants or other objects in an area may be forced away, dissipated, or eliminated by aiming or targeting the air projected by the fan blades rotating toward a target plant or other object. General air circulation caused by the rotating fan blades may dissipate or eliminate localized heat spots in a general plant growing area. As such, the circulating air removes the requirement of heat sinks for the grow lights 130.

The grow lights 130 may be placed on the fan blades 122 in a specific arrangement to provide a total of 1500 Watts per grow light fan 100. In some embodiments, each fan blade 122 includes a plurality of grow lights 130 to provide a 1500 Watt arrangement per fan blade. As a non-limiting example, each fan blade 122, or each grow light fan 100, may include 230 LEDs that are configured to emit light having exactly or approximately a wavelength of 630 nanometers (nm), 24 LEDs that are configured to emit light having exactly or approximately a wavelength of 460 nanometers, 14 LEDs that are configured to emit light having exactly or approximately a wavelength of 610 nanometers, 4 LEDs that are configured to emit light having exactly or approximately a wavelength of 410 nanometers, 4 LEDs that are configured to emit light having exactly or approximately a wavelength of 850 nanometers, 22 LEDs that are configured to emit light having exactly or approximately a color temperature of 14000K, and/or 2 LEDs that are configured to emit light having exactly or approximately a wavelength of 520 nanometers. Such wavelength values may vary up to +−20 nm and the color temperature values may vary up to +−1000 k.

Ranges of wavelengths may be attributed to colors. For example, 440-460 nm may be "royal blue", 460-490 nm may be "blue", 490-520 nm may be "cyan", 520-550 nm may be "green", 585-597 nm may be "amber", 613-620 nm may be "orange", and 620-645 nm may be "red". Chlorophyll performs photosynthesis by absorbing light. Chlorophyll has two main absorption peaks: one peak between 650-670 nm (red), and one peak between 430-450 nm (blue). As such, the grow lights 130 may be configured to provide light within the red absorption peak and/or blue absorption peak to maximize plant growth and health. Generally, wavelengths between 400 nm (blue) and 700 nm (red) are considered photosynthetically active radiation. As such a majority of grow lights 130 may be configured to emit light in the red or blue spectrum. As a non-limiting example, a ratio of red-spectrum lights or light to blue-spectrum lights or light may be between 4-to-1 and 20-to-1. It has been found that a 14-to-1 ratio of red LEDs to blue LEDs has been effective. In some embodiments the grow lights 130 may be configured to provide ultraviolet or infrared light.

Rotating the fan blades 122 while the grow lights 130 are illuminated illuminates a target plant arrangement below the grow light fan 100 with an even spectrum of light, similar to that of the sun. Since the fan blades and subsequently the grow lights rotate during illumination of the plants, at every subsequent moment, target plants receive an even, mixed, and a variety of light from the electromagnetic spectrum. For example, at a first instant a particular plant may receive a first spectrum exposure governed by a first position of the grow light fan 100. At a second instant, the particular plant may receive second a spectrum exposure governed by a second position of the grow light fan 100, the second spectrum exposure being different from the first spectrum exposure since the grow light fan 100 has moved from the first position to the second position.

Referring for the moment to FIG. 2, the individual fan blades 122 are connected to the central hub 118 by the support bars 124. Specifically, a first end 136 of the support bars 124 are affixed to the central hub 118 and a second end 138 of the support bars 124 are affixed to an upper side 140 of the fan blades 122. The fan blades 122 are provided to circulate air within a grow room and include a narrower inner blade end 142 and a wider outer blade end 144. However, the width of the fan blade 122 may be equivalent at the inner blade end 142 and the outer blade end 144, and any region in between the ends, without departing from scope of this disclosure. The second end 138 of the support bars are connected to the narrower inner blade end 142 of the fan blades 122. As shown, an outer end 146 of the connecting bars 126 is attached to a central portion of the support bars 124 for the motor 114 to rotate the fan blade assembly 116 relative to the bell housing 112 (see also FIG. 1). For example, the motor 114 may rotate the lower unit 128. The connecting bars 126 may be fixedly attached to the rotatable lower unit 128 and to either the fan blades or to the support bars 124. As such causing the lower unit 128 to rotate causes the connecting bars 126, the support bars 124, and the fan blades 122 to rotate. Each support bar 124 may be connected to one fan blade 122, and/or each connecting bar 126 may be connected to one fan blade 122. Further, each connecting bar 126 may be connected to one support bar 124 as shown in FIG. 1. The support bars 124 may be fixedly connected directly to the rotating lower unit 128 or any rotating element. It is to be understood that the each fan blade may be connected via only one bar to a rotating element or structure of the motor or motorized housing assembly. For example, a connecting bar may connect a fan blade 122 to the lower rotating unit 128 or the central hub 118.

Figure 3:
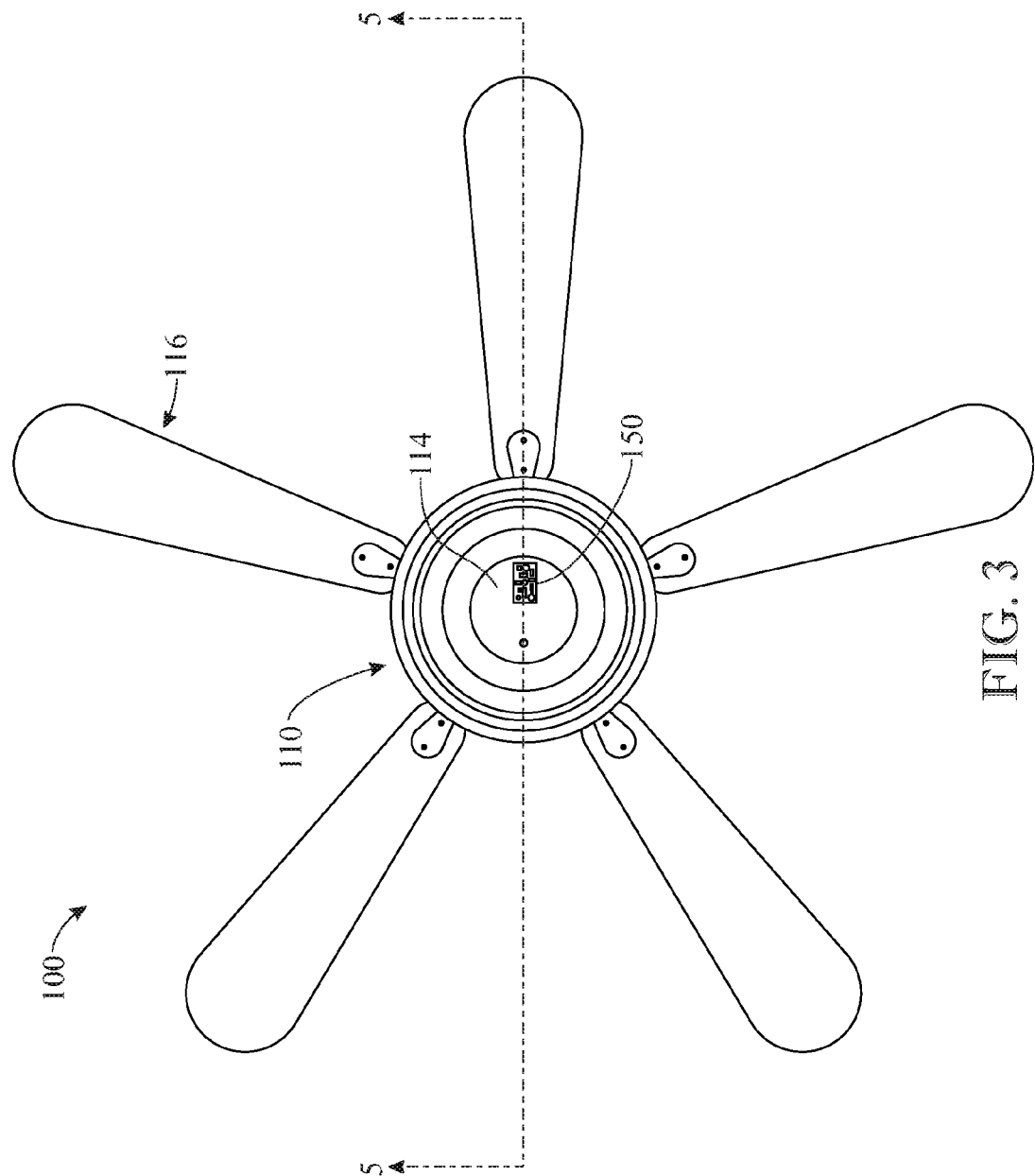
FIG. 3 presents a top plan view of the grow light fan, in accordance with aspects of the present disclosure.
Figure 4:
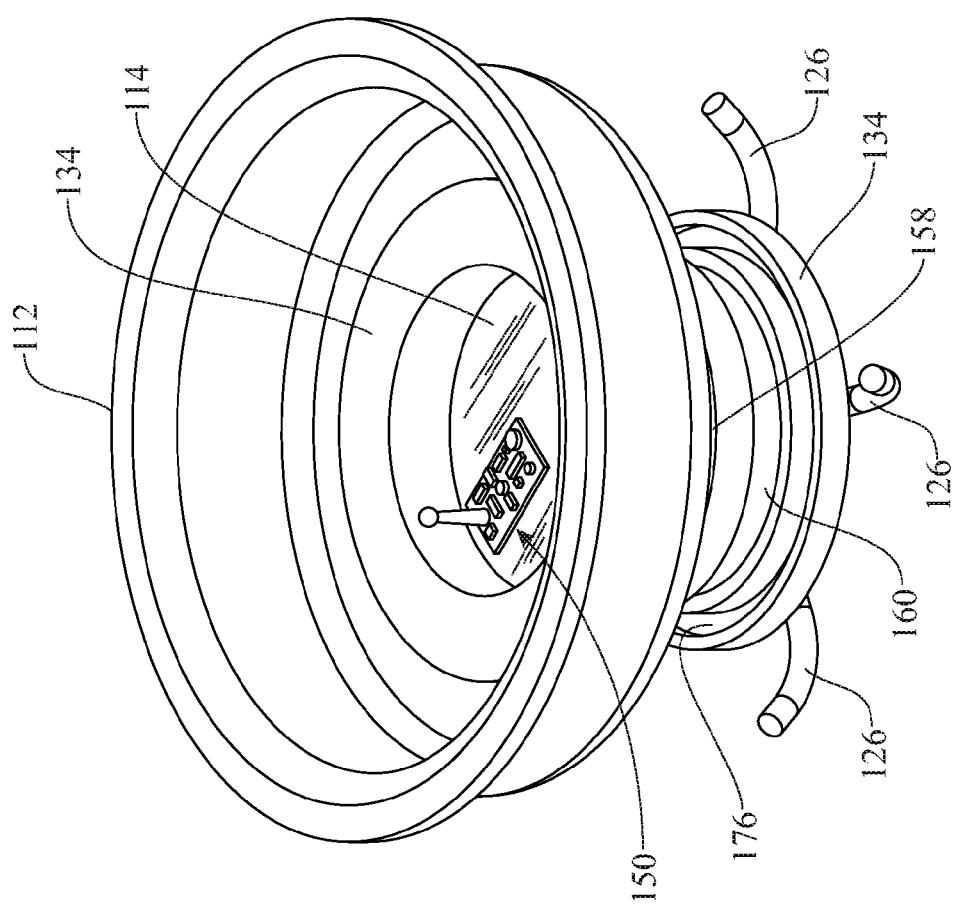
FIG. 4 presents a partial perspective view of the grow light fan illustrating a controller, in accordance with aspects of the present disclosure.

With reference to FIGS. 3 and 4, in order to control the speed and direction of rotation of the motor 114 and, more particularly, to control the illumination provided by the grow lights 130, the grow light fan 100 includes a controller 150 mounted within the motorized housing assembly 110 (on-board), or mounted off-board (e.g. on a wall, or a wired remote device or controller). The controller 150 is configured to receive signals or instructions from a wired or remote device or controller, where receiving the instructions causes the controller 150 to affect the illumination provided by the grow lights (e.g. color, wavelength, or intensity) and to affect the rotational speed and direction of the motor and subsequently the fan blades, according to the nature of the received instructions. The controller may be operable to provide the functions described herein via a pull chain or switch or dial as found in typical ceiling fans and portable fans. For example such a pull chain may be pulled to switch between parameters or settings of the controller. A dial may be included to dial between the various different parameters or settings.

It is to be understood that each grow light 130 or each set of grow lights 130 or each plurality of grow lights 130 on each fan blade 122 may be operatively connected to a respective controller. As such, a plurality of controllers may be included in the grow light fan 100. For example, a controller may be disposed on each fan blade 122, or each fan blade unit 120 for controlling one or more grow lights. In embodiments where a controller is disposed on a fan blade unit 120 or a fan blade 122, the controller receives power through the electrical connection provided by the mating of the motor support bracket 134 and the central hub 118.

As shown in the figures, the controller 150 is mounted on a stationary top surface 152 of the motor 114. Alternatively, the controller 150 may be mounted to the bell housing 112 of the motorized housing assembly 110, or any suitable surface of the grow light fan 100. For example, the controller 150 may be mounted to the rotating lower unit 128, the connecting bars 126, the support bars 124, motor support cylinder 134, the support bracket 134, or the central hub 118. The controller 150 is provided and configured to allow the user or grower to remotely adjust the intensity, color and even wavelengths of the grow lights 130 via user input. For example, the controller 150 may be configured to cause the intensity, color or wavelength of the grow lights 130 to change in response to a user input indicating an outcome desired by a user (e.g. increase or decrease wavelength, color, intensity, or selectively switch LED(s) on or off). The controller 150 may be operative to selectively switch on or off one or more (e.g. a pattern of) the grow lights 130. For example, the controller may be configured to switch on or off certain LED's of a certain color or intensity. The controller 150 may be settable to a specific preset in response to a user input that indicates the specific preset. An example preset may be fast, medium or slow rotation speed of the rotating fan blades, or low, medium, or high intensity for the LED's. Further, various color settings may be programmed into or via the controller 150, such as a "mono-color" setting or any setting that may maximize growth and health of an illuminated plant. Further, the controller 150 may allow the individual LED's of the grow lights 130 to be adjusted independently of each other to customize a grow light illumination or pattern emitted by the grow lights 130. The controller 150 generally includes a control or circuit board 154 and an antenna or receiver 156 for receiving control instruction signals from a wireless or wired remote control (not shown) for causing operative changes of the grow light fan 100. The signals may come in the form of electrical, digital, Radio Frequency or RF signals, Wi-Fi type signals, Bluetooth signals, etc. and may be chosen as to not interfere or be interfered with by other signals being transmitted in the vicinity of the grow light fan light. The signals may be transmitted to the controller 150 by a hand held device or computer. As such, a remote control device may receive a user input to send instructions to the controller 150 for changing the operation parameters or settings of the grow light fan 100, the settings or parameters being one or more of rotation speed, rotation direction, light intensity, wavelength, color, illumination pattern, illumination time, or shutoff time. The remote controller may switch on or off the grow lights 130 or the motor 114. The instructions may be receivable by the controller 150 to define a rotation speed or angular velocity of the fan blades, or to define illumination settings or parameters for the LED's. For example, the illumination settings may include an illumination wavelength, color, intensity, or pattern of LED's (e.g. a color, intensity or illumination pattern). As such the controller 150 is operatively connected to the motor 114 and/or the grow lights 130 to control the motor 114 and/or the grow lights 130.

The remote control device may be a handheld computer such as a smartphone, and the smartphone may be equipped with a software application that provides a user of the handheld device with an interface to control the controller 150 wirelessly or wiredly via user inputs such as taps on a touch-screen display or clicks via a cursor. Further, a camera may be set up to record and provide to the user live footage of a grow operation that is illuminated by the grow light fan 100. The footage may be provided to the user device via a data network connection such as the internet, for example.

In some embodiments one or more green LED lights may be located either on a rotating or non-rotating (e.g. fixed) structure of the grow light fan 100 to provide a user with visibility in low-light conditions. Plants do not see green light and as such placing green lights on the grow light fan 100 to illuminate a growing area in low-light conditions will not interfere with growth of the plants. For example, such green light LED's may be disposed or mounted at the bottom of the lower unit 128, or on any structure of the grow light fan 100.

Figure 5:
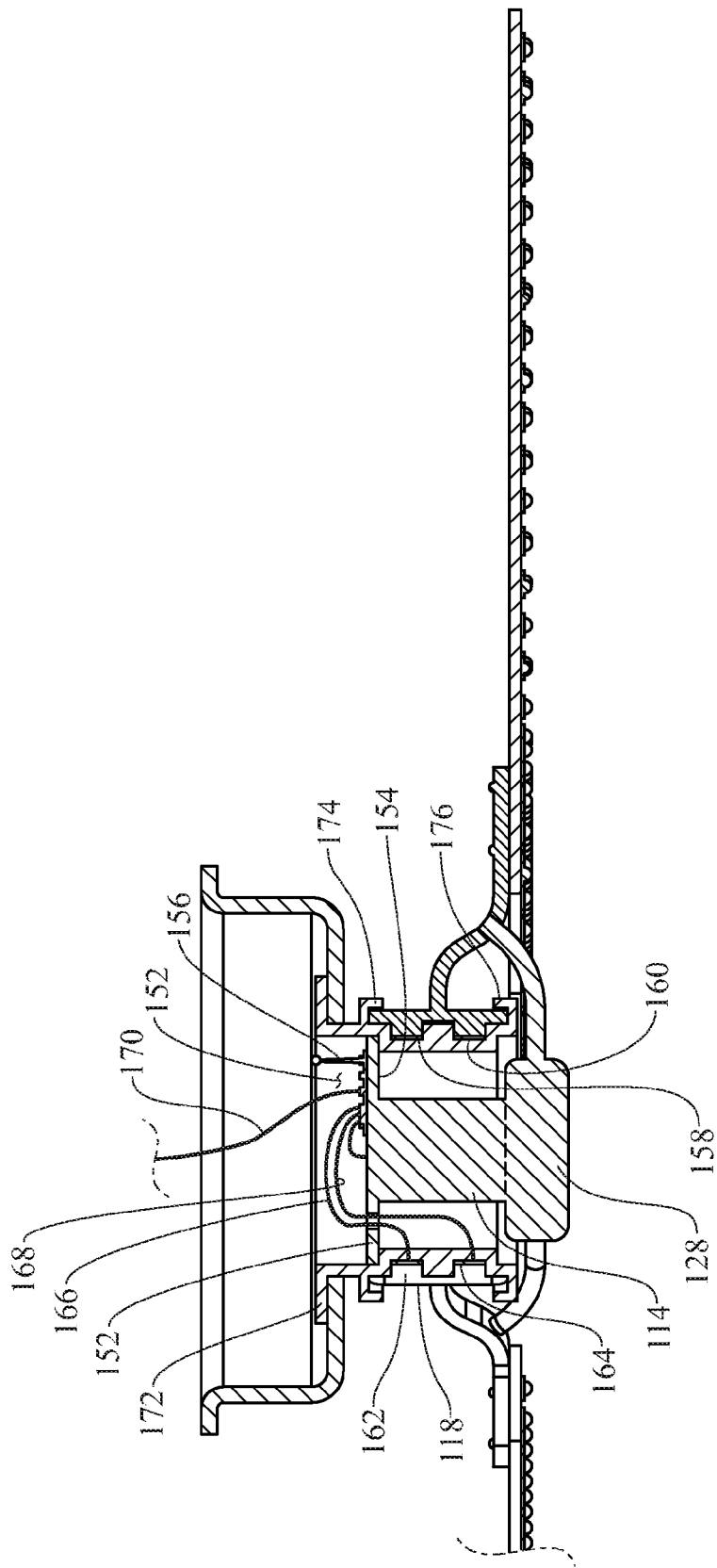
FIG. 5 presents a side view, partially shown in section, of the grow light fan taken along line 5-5 of FIG. 3, in accordance with aspects of the present disclosure.

Referring now to FIG. 5, in order to transmit both power to the grow lights 130 and signals received from the controller 150 to the grow lights 130 before or while the grow lights 130 are rotating with the fan blade units 120 about the motorized housing assembly 110, the motor support cylinder 134 includes a pair of horizontally oriented, upper and lower circumferential channels 158 and 160, respectively (See also, FIG. 4). The upper and lower channels 158 and 160 function as rotational electrical connectors or contacts for engagement with corresponding inwardly directed upper and lower rings 162 and 164 extending from the central hub 118 of the fan blade assembly 116. For example, the motor support cylinder 134 maintains electrical contact between the grow lights 130 and a power source continuously during rotation of the fan blades 120. As such, the upper and lower channels 158, and central hub are mated or coupled such that the grow lights 130 are powered for illumination continuously while the fan blades rotate. For example, the grow lights 130 may be powered continuously through a full 360 degree rotation, or full range of motion, of a fan blade. Additionally, the positions of the upper ring 162 and the lower ring 164 of the central hub 118 within the upper and lower channels 158 and 160, respectively, of the motor support cylinder 134 functions to rotatably support the fan blade assembly 116 on the motorized housing assembly 110. Cables 166 and 168 extend from the controller 150 to contact pads (not shown) located within the upper and lower channels 158 and 160 to transmit power and control instructions or settings to the grow lights 130 through the central hub 118. The controller 150 controls the LED's (e.g. power) through the rotatable connection offered by the mating of the channels 158 and 160 and lower rings 162 and 164. A power cord 170 runs from an external source of power to the controller 150 to power the grow light fan 100. A grounded connection may be included on the motor 114 or the bell housing 112. The controller 150 is also operatively connected to the motor 114 for controlling a rotation speed and direction of the motor. The controller 150 may be operatively connected wirelessly or wiredly to a remote control device such as a smart phone, a laptop or a computer terminal.

As shown, a flange 172 of the motor support cylinder 134 supports the motor support cylinder 134, the motor 114 and the controller 150 from or on the bell housing 112 and outwardly extending upper and lower channels 174 and 176 of the motor support cylinder 134 rotatably support the fan blade assembly 116, specifically the central hub 118 of the fan blade assembly 116, on the motor support cylinder 134.

With reference to FIGS. 5 and 6, the electrical system and use of the grow light fan 100 will now be described. The central component of the electrical system is the controller 150 which may receive input from an operator (user) via a transmitter or remote controller (not shown) and converts or processes that input to control the motor 114 and the grow lights 130. For example, the controller 150 may turn the grow lights 130 on or off. The controller 150 receives power from an external source through power cord 170 and is in electrical communication with the motor 150 through motor power line 178. Thus, the controller 150 can control the direction and speed of the fan blade assembly 116 driven by the motor 114 as described hereinabove.

The controller 150 also controls each of the individual grow light 130 LED's on the underside 132 of the individual paddle shaped fan blades 122. It should be noted that the controller 150 can adjust the brightness or wavelength of all of the grow lights 130 collectively on all the fan blades 122 such that all the grow lights 130 are adjusted together, or separately for each fan blade 122 such that all the grow lights 130 on the same fan blade 122 are adjusted similarly, or individually on each individual fan blade 122 such that each grow light 130 on a single fan blade 122 is adjusted separately. Further, in some instances, it is desirable to adjust the intensity of the grow lights 130 radially along the fan blades 122 to project an even distribution of light. For example, the brightness or intensity of grow lights 130a near the narrower inner blade end 142 of the fan blade 122 may be adjusted lower than the grow lights 130c near the wider outer blade end 144 to compensate for the further radial spacing or light density of the grow lights 130c across the fan blade assembly 116. Grow lights 130b, located between the narrower inner blade end 142 and the wider outer blade end 144 may be adjusted in intensity between that of the grow lights 130a and 130c. As such, a cross sectional plane under the grow light fan 100 taken across a path of the illumination light will have an even spectrum of light, the cross sectional plane taken perpendicularly to the rotational axis R.

In order to control the grow lights 130, the controller 150 transmits the appropriate power through cables 166 and 168 to the upper and lower channels 158 and 160 in the motor support cylinder 134. The cables 166 and 168 terminate in and connect to upper and lower contact pads 180 and 182 located within the upper and lower channels 158 and 160, respectively, of the motor support cylinder 134. A pair of blade cables 184 and 186 extend through the central hub 118 of the fan blade assembly 116 to the individual grow lights 130 on the fan blades 122. Upper and lower pickups 188 and 190 are positioned on the upper and lower rings 162 and 164, respectively, of the central hub 118 and are in electrical communication with the upper and lower contact pads 180 and 182 on the motor support cylinder 134. This allows the electrical signals to be transmitted between the motor support cylinder 134 and the central hub 118 while the central hub 118 and the motor support cylinder 134 rotate relative to each other. For example, electrical contact or communication channels remains between the blade cables 184 and 186, and the cables 166 and 168 while the upper and lower rings 162 and 164 rotatably slide along channels 158 and 160 respectively. As such, the LED's remain powered according to the settings, parameters, or presets the controller 150 is programmed to hold via the above described remote control.

It should be noted that, by providing the individual grow lights 130 directly laterally protruding from the underside 132 of the fan blades 122, the grow lights 130 are in the direct air flow across the fan blades 122 such that the grow lights are continually cooled by the air currents passing over the fan blades 122 as they rotate. In this manner, extra fans, auxiliary ventilation systems not required to maintain the grow lights 130 at acceptable temperatures to prevent overheating. On the other hand, each fan blade may have faces that are parallel with respect to other faces of other fan blades and/or parallel with a rotational plane of the fan blades. The grow lights 130 may be arranged in a particular way to provide maximal airflow to each grow light of the grow lights 130. For example, the grow lights 130 may be arranged in a pattern that evenly provides airflow to each grow light 130 for cooling the grow lights or removing hot spots around each grow light. For example, the grow lights 130 may be disposed in a triangular pattern found in bowling pin starting arrangements, where each grow light 130 is slightly offset from a frontal grow light 130. As such, the grow lights may be disposed or fixed as a series of parallel rows, where each row is slightly offset from an adjacent row so that air flows evenly through the grow lights.

Thus, the grow light fan 100 provides a novel and useful device and method of providing a remotely user variable growing light to plants while maintaining the individual grow lights 130 at acceptable temperatures to avoid overheating of the grow lights 130. Further, the grow light fan 100 provides a uniform spectrum of light intensity to target plants, and is configured to allow a user to selectively adjust light intensity of the lights and environmental temperature in a grow room environment.

In some embodiments the methods or tasks described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods or tasks described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A grow light fan for uniformly directing plant stimulating radiation to a target plant, the grow light fan comprising:

a motor, the motor supported by a motor support structure;
the motor configured to rotate a rotatable hub about a rotational axis;
one or more fan blades attached to the rotatable hub; and
one or more grow lights fixed to the one or more fan blades and in electrical connection with the rotatable hub, the one or more grow lights configured to stimulate growth of the target plant by directing the plant stimulating radiation to the target plant,
wherein the fan blades are configured to project air toward the target plant during rotation of the fan blades;
wherein the motor support structure includes a horizontally oriented circumferential channel; and
wherein the circumferential channel of the motor support structure is configured to be a rotational electrical connector for engagement with a corresponding inwardly directed ring extending from the rotatable hub to maintain electrical connection between the one or more grow lights and a power source through the rotatable hub and the motor support structure for providing power to the one or more grow lights continuously during rotation of the fan blades through a full range of motion to continuously illuminate the one or more grow lights while the fan blades rotate and while the ring rotatably slides along the circumferential channel.

2. The grow light fan of claim 1, further comprising:
a controller to control a rotation speed of the one or more fan blades.

3. The grow light fan of claim 1, further comprising:
a controller to control a rotation direction of the one or more fan blades.

4. The grow light fan of claim 1, further comprising:
a controller to control a light intensity of the one or more grow lights.

5. The grow light fan of claim 1, further comprising:
a controller to selectively switch the one or more grow lights on and off.

6. The grow light fan of claim 1, further comprising:
a controller to control a wavelength emitted by the one or more grow lights.

7. The grow light fan of claim 1, further comprising:
a controller to control plant stimulating radiation emission of the one or more grow lights, the controller operatively connected to a wireless remote device.

8. A grow light fan for directing plant stimulating radiation to a target plant, the grow light fan comprising:
a motor, the motor supported by a motor support structure;
the motor configured to rotate a rotatable hub about a rotational axis;
one or more fan blades fixedly attached to the rotatable hub such that the fan blades extend radially from the rotatable hub;
one or more grow lights fixed to the one or more fan blades and in electrical connection with the rotatable hub, the one or more grow lights configured to stimulate growth of the target plant by directing the plant stimulating radiation to the target plant;
wherein the fan blades are configured to project air toward the target plant during rotation of the fan blades;
wherein the one or more grow lights include approximately 230 LEDs that are configured to emit light having approximately a wavelength of 630 nanometers, approximately 24 LEDs that are configured to emit light having approximately a wavelength of 460 nanometers, approximately 14 LEDs that are configured to emit light having approximately a wavelength of 610 nanometers, approximately 4 LEDs that are configured to emit light having approximately a wavelength of 410 nanometers, approximately 4 LEDs that are configured to emit light having approximately a wavelength of 850 nanometers, approximately 22 LEDs that are configured to emit light having approximately a color temperature of approximately 14000K, and approximately 2 LEDs that are configured to emit light having approximately a wavelength of 520 nanometers; and
wherein the motor support structure includes a horizontally oriented circumferential channel; and
wherein the circumferential channel of the motor support structure is configured to be a rotational electrical connector for engagement with a corresponding inwardly directed ring extending from the rotatable hub to maintain electrical connection between the one or more grow lights and a power source through the rotatable hub and the motor support structure for providing power to the one or more grow lights continuously during rotation of the fan blades through a full range of motion to continuously illuminate the one or more grow lights while the fan blades rotate and while the ring rotatably slides along the circumferential channel.

9. The grow light fan of claim 8, wherein the fan blades are configured to circulate air and move air over the one or more grow lights for cooling the grow lights during rotation of the fan blades.

10. The grow light fan of claim 8, further comprising:
an electrical connector to electrically connect the one or more grow lights to a power source, the electrical connector providing power to the one or more grow lights continuously during rotation of the one or more fan blades through a full range of motion.

11. The grow light fan of claim 8, further comprising:
a controller to control a rotation speed of the one or more fan blades.

12. The grow light fan of claim 8, further comprising:
a controller to control a rotation direction of the one or more fan blades.

13. The grow light fan of claim 8, further comprising:
a controller to control a light intensity of the one or more grow lights.

14. The grow light fan of claim 8, further comprising:
a controller to selectively switch the one or more grow lights on and off.

15. The grow light fan of claim 8, further comprising:
a controller to control a wavelength emitted by the one or more grow lights.

16. The grow light fan of claim 8, further comprising:
a controller to control plant stimulating radiation emission of the one or more grow lights, the controller operatively connected to a wireless remote device.

17. A grow light fan for uniformly directing plant stimulating radiation to a target plant, the grow light fan comprising:
a motor, the motor supported by a motor support structure;
the motor configured to rotate a rotatable hub about a rotation axis;
one or more fan blades fixedly attached to the rotatable hub such that the fan blades extend radially from the rotatable hub;
one or more grow lights fixed to the one or more fan blades and in electrical connection with the rotatable hub, the one or more grow lights configured to stimulate growth of the target plant by directing the plant stimulating radiation to the target plant; and
a controller located in the motor support structure, the controller configured to control a light emission property of the one or more grow lights in response to a received user input;
wherein the fan blades are configured to project air toward the target plant during rotation of the fan blades;
wherein the motor support structure includes a horizontally oriented upper circumferential channel and a horizontally oriented lower circumferential channel;
wherein the upper and lower circumferential channels of the motor support structure are configured to be rotational electrical connectors for engagement with corresponding inwardly directed upper and lower rings extending from the rotatable hub to maintain electrical connection between the one or more grow lights and a power source through the rotatable hub and the motor support structure for providing power to the one or more grow lights continuously during rotation of the fan blades through a full range of motion to continuously illuminate the one or more grow lights while the fan blades rotate;

wherein to control the light emission property of the one or more grow lights, the controller is operatively connected to the one or more grow lights through rotational electrical connection provided by engagement between the upper and lower circumferential channels of the motor support structure and the upper and lower rings of the rotatable hub via one or more electrical cables that extend from the controller to the upper and lower circumferential channels of the motor support structure; and wherein the one or more grow lights include approximately 230 LEDs that are configured to emit light having approximately a wavelength of 630 nanometers, approximately 24 LEDs that are configured to emit light having approximately a wavelength of 460 nanometers, approximately 14 LEDs that are configured to emit light having approximately a wavelength of 610 nanometers, approximately 4 LEDs that are configured to emit light having approximately a wavelength of 410 nanometers, approximately 4 LEDs that are configured to emit light having approximately a wavelength of 850 nanometers, approximately 22 LEDs that are configured to emit light having approximately a color temperature of approximately 14000K, and approximately 2 LEDs that are configured to emit light having approximately a wavelength of 520 nanometers.

18. The grow light fan of claim 17, wherein the controller is configured to control plant stimulating radiation emission of the one or more grow lights and a rotation speed of the one or more fan blades, the controller wirelessly and operatively connected to a remote device.

\* \* \* \* \*